United States Patent [19]

Sterling, Jr. et al.

[11] Patent Number: 4,729,125

[45] Date of Patent: Mar. 1, 1988

[54] ON-LINE SERIAL COMMUNICATION INTERFACE TO A TRANSMITTER FROM A CURRENT LOOP

[75] Inventors: Edward L. Sterling, Jr., Cleveland; William L. Thompson, Montville, both of Ohio

[73] Assignee: The Babcock & Wilcox Company, New Orleans, La.

[21] Appl. No.: 764,913

[22] Filed: Aug. 12, 1985

[51] Int. Cl.[4] .............................................. H04B 3/60

[52] U.S. Cl. .................................. 375/36; 340/310 R

[58] Field of Search ...................... 340/870.01, 870.07, 340/870.03, 870.39, 538, 310 R, 310 A; 307/2, 3; 179/2 DP, 84 VF; 375/36; 379/93, 96, 237

[56] References Cited

U.S. PATENT DOCUMENTS 4,520,488 5/1985 Houvig et al. .................. 340/310 R 4,538,136 8/1985 Drabing .......................... 340/310 R

*Primary Examiner*—Benedict V. Safourek

*Attorney, Agent, or Firm*—Vytas R. Matas; Robert J. Edwards

[57] ABSTRACT

A serial communication interface establishes communication to the microprocessor of a transmitter, from a current loop which is powered by a power supply. The microprocessor outputs an analog signal corresponding to a process variable and also can receive a serial communication voltage pulse signal. The analog signal is applied to a current regulating circuit which draws current from the power supply onto the current loop in an amount which is proportional to the process variable. A comparator in the form of an operational amplifier has an output connected to the microprocessor for applying the serial communication voltage pulse signal to the microprocessor. The comparator has one input which is held at a slight negative voltage and another input which is connected to a line of the current loop connected to the negative terminal of the power supply. To establish communication from the current loop to the microprocessor, voltage on the current loop is modulated by a small amount to generate small voltage pulses which are applied to a positive input of the comparator. The comparator amplifies the small voltage pulses into larger voltage pulses which are then applied to the input of the microprocessor to establish digital communication with the microprocessor. In this way the analog signal on the current loop can be maintained simultaneously with digital communication between the loop and the microprocessor.

3 Claims, 2 Drawing Figures

[TRANSMITTER (COMMUNICATION INTERFACE AND MICROPROCESSOR)] 10

ON-LINE SERIAL COMMUNICATION INTERFACE TO A TRANSMITTER FROM A CURRENT LOOP

FIELD AND BACKGROUND OF THE INVENTION

The present invention relates in general to serial communication interfaces for digital communications, and in particular to a new and useful interface for establishing digital communications from two-line current loop to a transmitter of the current loop.

Two-wire analog transmission systems are well known. Such systems include a transmitter which is connected to a power supply by two wires which form a current loop. The transmitter includes, as at least one of its features, a transducer which senses a condition such as pressure or temperature. This condition is known as a process variable (PV).

A power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 mA to a maximum of 20 mA. The current between 4 and 20 mA passes through the resistor to produce a voltage drop across the resistor. This voltage drop can be measured to give a value for the process variable.

It is noted that the 4 mA minimum current is required to energize the circuitry of the transmitter. Any excess current above this 4 mA level is taken as a value which can be used to determine the process variable.

It is known that such 4–20 mA two-wire systems have an accuracy which is limited to around 0.1% at best. These systems are also essentially unidirectional with the transmitter being essentially uncontrolled and transmitting continuously.

The transmitters in such circuits are generally limited in accuracy to about 0.1% and their functionality is limited to only continuous reading and sensing of the process variable.

SUMMARY OF THE INVENTION

The present invention utilizes microprocessor technology to improve the overall accuracy and expand the functionality of transmitter devices.

The present invention provides an apparatus for interfacing a computer or hand-held terminal with a current loop for digital communications from a two-wire current loop transmitter while the transmitter is still on-line (sending analog information) to a controller or some other monitoring device.

Accordingly an object of the present invention is to provide an on-line serial communication interface for a current loop arrangement which includes a power supply for supplying current at varying levels, a current loop connected to the power supply for carrying the current levels, a current regulating circuit connected to the current loop for drawing the current level from the power supply, and a transmitter having microprocessor means with a first port connected to an input of said current regulating circuit for applying a continuous analog signal to the current regulating circuit for drawing a current level corresponding to a process parameter measured by the transmitter, the microprocessor means having a second port for receiving a serial communication voltage pulse signal, wherein the interface comprises an operational amplifier having its output connected to the second port of the microprocessor means, a first input connected to a selected fixed source of voltage, and a second input connected to one line of the current loop for receiving current pulses from the current loop, which current pulses respond to the serial communication voltage pulse signals to the microprocessor means.

A further object of the invention is to provide an on-line serial communication interface to a transmitter having a microprocessor, from a current loop connected to the transmitter, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
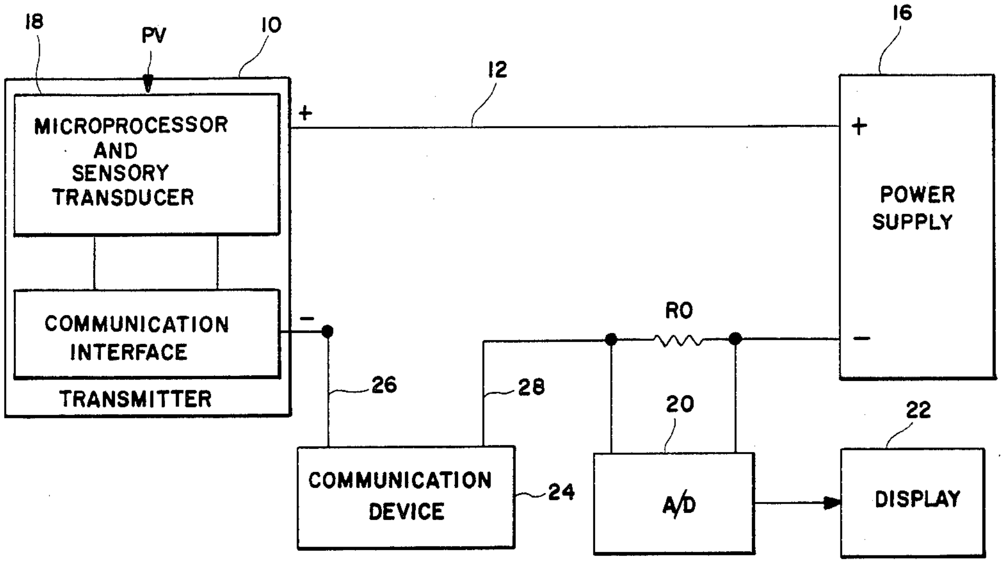
FIG. 1 is a block diagram showing a conventional current loop having a communication device such as a computer or hand-held terminal connected to the current loop.

Referring to the drawings in particular, the present invention, provides an on-line serial communication interface between a transmitter 10, of a 4–20 mA loop and the remainder of the loop including lines 12 and 14 and power supply 16. As is known, one of the lines 14 may include a resistor RO, which has a voltage drop thereacross proportional to a current flowing in the lines 12,14. Transmitter 10 may include a transducer such as a pressure or temperature transducer (not shown) which receives a process variable PV. The transducer may be connected to a microprocessor 18 in transmitter 10 which controls the amount of current to be drawn from power supply 16 on lines 12 and 14.

The voltage drop across resistor RO is measured by an analog-to-digital converter 20. This voltage drop can be displayed on a display unit 22 as a measurement of the process variable PV.

A communicating device 24 is connected to the current loop line 14 by connecting lines 26 and 28. Communicating device 24 is a digital circuit such as a computer, microprocessor or hand-held terminal. Device 24 receives digital information in the form of voltage pulses on lines 26 and/or 28 for establishing digital communication with the current loop. Device 24 must be an RS-232C device. An RS-232C device is a serial device which sends logical signals one bit at a time. A logic high is between +3 and +12 volts and a logic low between −3 and −12 volts.

Figure 2:
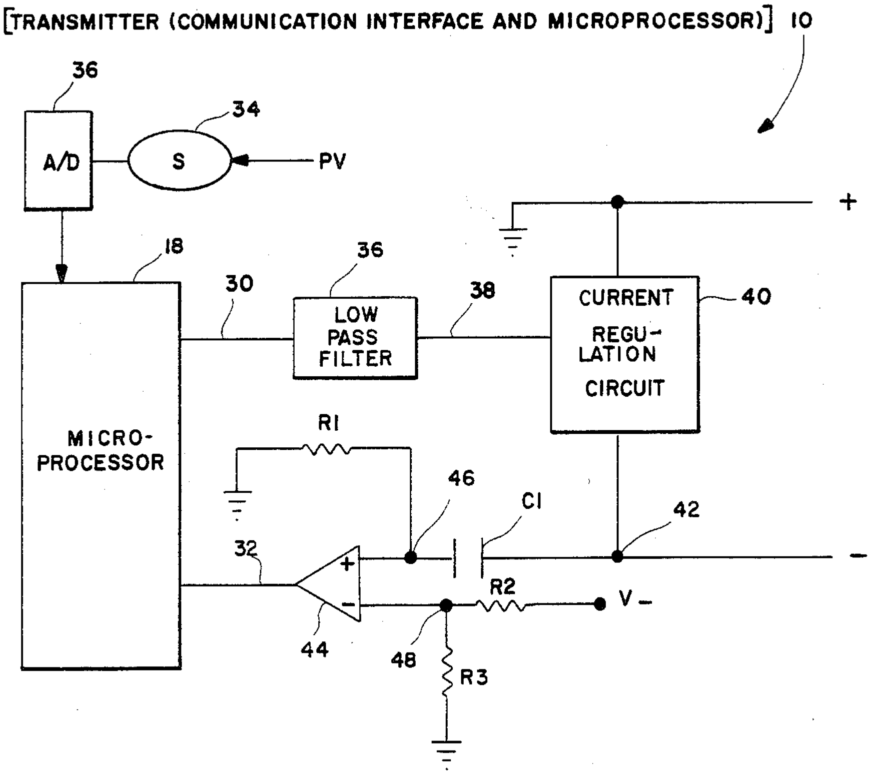
FIG. 2 is a schematic block diagram of the inventive off-line serial communication interface showing its interconnection with the transmitter of the current loop illustrated in FIG. 1.

FIG. 2 illustrates the on-line serial communication interface of the present invention.

As shown in FIG. 2, the transmitter which is generally designated 10 in FIG. 2, comprises a microprocessor 18 which has output port 30 and input port 32. A process parameter PV is sensed by a sensor 34 such as a differential pressure or temperature sensor. Sensor 34 generates an analog signal such as a voltage level which is converted into a digital signal by analog-to-digital convertor 36. The digital signal is provided to microprocessor 18 which outputs a digital signal corresponding to the process parameter on port 30. This signal is in the form of a voltage pulse train at a fixed frequency but with a duty cycle which varies according to the process parameter PV. For low pressure or temperature values, for example a pulse train having very short pulse durations within a fixed time period is generated and applied to line 30. For higher signals from sensor 34, broader pulses are generated again within the fixed time period for each pulse.

A low pass filter 36 is connected to port 30 and generates a continuous voltage on its output 38. The level of this voltage is proportional to the duty cycle of the pulses on line 30 so that low pass filter 36 acts as a digital-to-analog converter. The voltage is applied to current regulating circuit 40 which is of know design and which draws an amount of current from power supply 16 on the current loop made up of lines 12 and 14, which are proportional to the signal from the low pass filter 36, and thus in turn proportional to the process parameter PV.

According to the present invention, microprocessor 18 may also receive serial digital pulses on its second port 32. This can be used for receiving digital communication from the current loop made up of lines 12 and 14. It is noted that this digital communication can be superimposed on the analog information which is already on the current loop.

The two signals are superimposed at point 42.

In the idle-state (no communication) port 32 is at a fixed voltage. To establish communication, microprocessor 18 must receive voltage pulses.

These voltage pulses are produced by the digital circuit 24 in the form of small voltage modulations on the current loop as will be explained later.

To establish communication from the current loop made up of lines 12 and 14, the invention as shown in FIG. 2 includes an operational amplifier 44 which has an output connected to the second port 32 of microprocessor 18.

When it is wished to commence digital communication from the loop to the microprocessor, a voltage on the loop is modulated by an amount which is less than 1 volt. These voltage pulses will appear at point 42 and will be capacitor coupled by capacitor C1 at point 46 connected to one input of the operational amplifier 44. Point 48 connected to the second input of amplifier 44 is held at a slight negative voltage produced by a resistor divider made up of resistors R2 and R3. This holds the output of comparator 44, at input port 32 for microprocessor 18, at a logical high until communication starts. The operational amplifier 44 acts as a comparator to convert the incoming pulses from the current loop 12, 14, which as noted above are at less than 1 volt, to 5 volt pulses that the microprocessor 18 needs to receive the digital information.

It has been found that with 0.7 volt pulses on the current loop, which do not disturb the analog information on the current loop, 5 volt pulses can be generated on the input port 32 for microprocessor 18.

Point 46 is also connected to ground over resistor R1 for the proper functioning of the comparator 44.

A major advantage of the present invention is that communication can be achieved while the transmitter is still on-line with a controller. This is possible because there is no effect on the current in the loop. Communication is done by modulating a voltage in the loop.

While a specific embodiment of the invention has been shown and described in detail to illustrate the application of the principles of the invention, it will be understood that the invention may be embodied otherwise without departing from such principles.

What is claimed is:

1. In a current loop arrangement having a power supply for supplying a current at various levels, a current loop connected to the power supply for carrying the current levels at a selected voltage level, a current regulating circuit connected to the current loop for driving the current levels from the power supply according to a voltage applied to an input of the current regulating circuit, a transmitter having microprocessor means with one port connected to the input of the current regulating circuit for applying a continuous voltage level to the current regulating circuit which is proportional to a process parameter measured by the transmitter, and a digital circuit for modulating the selected voltage level on the current supply by voltage pulses for carrying digital information to the current loop, the microprocrocessor means having a second port for receiving the serial communication voltage pulses, an on-line serial communication interface for establishing communication with the microprocessor from the current loop, comprising an amplifier having an input connected to one line of the current loop, an output of said amplifier connected directly to the second port of the microprocessor means for applying the serial communication voltage pulses while the current regulation circuit is being concurrently driven by the microprocessor means such that the current levels on the current loop are uninterrupted, and a second input of said amplifier adapted for connection to a source of fixed voltage at a selected small level whereby modulations of the selected voltage level by the digital circuit cause the formation of larger voltage pulses forming the serial communication voltage pulses of the microprocessor means.

2. An interface according to claim 1 including a voltage divider connected to the second input of the amplifier made up of at least two resistors, and a further resistor connected between the first mentioned input of the amplifier and ground.

3. An interface according to claim 2 including a low pass filter connected between the first port of the microprocessor means and the input of the current regulating circuit.

* * * * *